W. LIPPITZ.
POTATO PLANTER.
APPLICATION FILED SEPT. 18, 1919.
1,389,060.
Patented Aug. 30, 1921.
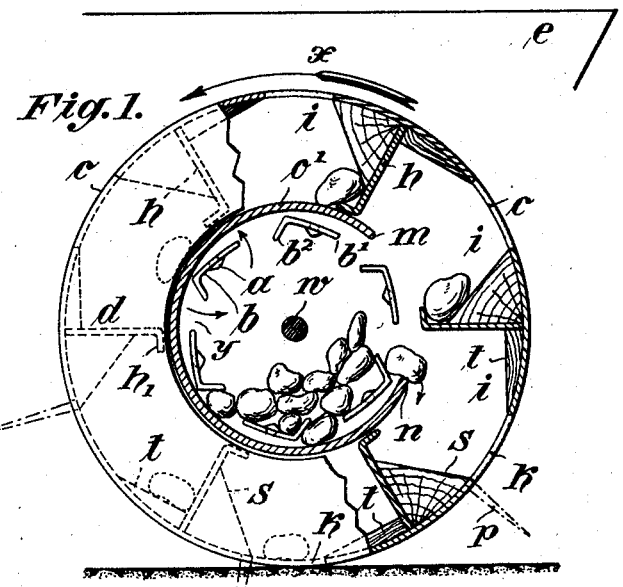
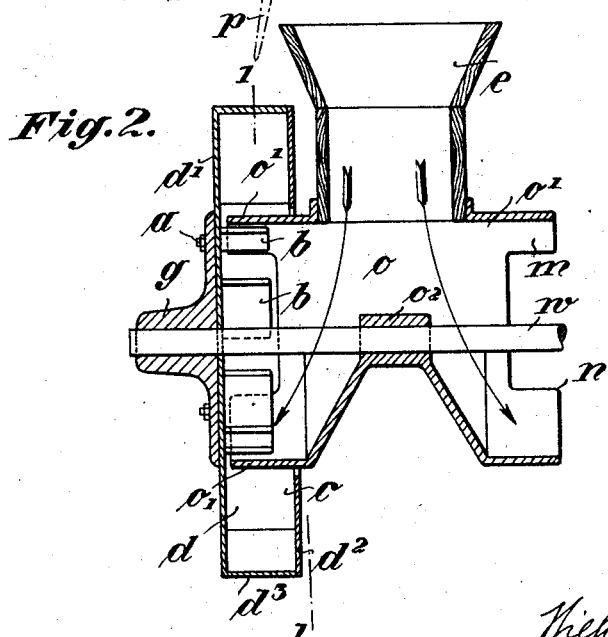
Wilhelm Lippitz
By Davis & Davis
Attys

UNITED STATES PATENT OFFICE.

WILHELM LIPPITZ, OF JAUER, GERMANY.

POTATO-PLANTER.

1,389,060. Specification of Letters Patent. Patented Aug. 30, 1921.

Application filed September 18, 1919. Serial No. 324,721.

*To all whom it may concern:*

Be it known, that I, WILHELM LIPPITZ, a citizen of Germany, residing at Jauer in Schlesien, in the State of Prussia, Germany, have invented certain new and useful Improvements in Potato-Planters; and I do hereby declare the following to be a full, clear, and exact description of the invention, such as will enable others skilled in the art to which it appertains to make and use the same.

My invention relates to improvements in potato planters, and the object of the improvements is to provide a planter in which the potatoes are uniformly and continuously supplied from the hopper to the dropping chambers. A further object of the improvements is to provide a planter in which the distributing members provided intermediate the hopper and the dropping chambers are adjustable relatively to one another and to the wall of the distributing chamber according to the size of the potatoes. With these and other objects in view my invention consists in the matters to be described hereinafter and particularly pointed out in the appended claims. For the purpose of explaining the invention an example embodying the same has been shown in the accompanying drawing, in which the same letters of reference have been used in all the views to indicate corresponding parts.

In said drawing—

Figure 1, is a section taken on the line 1—1 of Fig. 1 and showing the dropping drum, and Fig. 2, is a cross-section of the storage receptacle and one of the drums coöperating therewith, an arrow showing the direction of the travel.

In the example shown in the figures the planter consists of a receptacle $o$ to which the potatoes are supplied through a hopper $e$, and which is formed with laterally projecting substantially cylindrical portions $o'$. On a rotary shaft $w$ mounted in a hub $o^2$ a pair of dropping drums $d$ are mounted, only one of which is shown in Fig. 2. As shown the said drum consists of a hub $q$ keyed to the shaft $w$, a circular outer disk $d'$, an inner annular disk $d^2$, and a cylindrical wall $d^3$. The cylindrical portions $o'$ project into the drums $d$ substantially to the outer wall $d'$, and the inner diameter of the inner disk $d^2$ is slightly larger than the outer diameter of the cylindrical portion $o'$, so that only so much clearance is provided between the cylindrical portions $o'$ and the disks $d'$ and $d^2$ as is necessary for a free rotary movement of the drums. Internally of the cylindrical portions $o'$ angular distributing scoops $b$ are secured to the disk $d$ by means of screws $a$, and one of the shanks ($b'$) of each scoop is adjacent to the cylindrical portion $o$, while the other shank ($b^2$) is directed inward and away from the said portion and at an angle to the radius thereof, so as to provide a surface for transporting the potatoes. The cylindrical portions $o'$ are formed each with a lateral cut-out portion $m$—$n$. The outer or dropping chamber $i$ is provided with substantially radial partitions $h$ having their inner ends $h'$ bent forward in the direction of the rotary movement of the drum and dividing the said chamber into sections the number of which corresponds to the number of the scoops $b$. Preferably the angles between the forward faces of the partitions $h$ and the circumferential wall $d^3$ are partly filled out by wooden blocks $s$ of triangular cross-section, on which the potatoes dropping through the cut-out portions $m$—$n$ and into the sections of the chamber $i$ are caught, as will be described hereinafter. At the rear of the said partitions lining blocks $t$ of wood are secured to the circumferential wall $d^3$, which are slightly sloping from the partitions and toward the circumferential wall. Between the front ends of the blocks $s$ and the rear ends of the linings $t$ apertures $k$ are made in the circumferential wall. To the said wall spacing spikes $p$ are secured.

The operation of the apparatus is as follows: The potatoes are supplied through the hopper and to either side of the storage chamber $o$ and into the cylindrical portions $o'$ thereof, where they are gathered on the scoops $b$. As the apparatus travels over the field with the spikes $p$ engaging in the soil, the drums $d$ are rotated in the direction of the arrow $y$ shown in Fig. 1. Thereby one of the potatoes which is engaged between successive scoops $b$ is carried along and lifted by the transporting shank $b^2$, until it arrives at the cut-out portion $m$—$n$. As in this position of the scoop $b$ the shank $b^2$ is inclined outward and downward, the potato is dropped into the adjoining section of the chamber $i$ and on the wooden block $s$. It is carried along by the said block and upward and gradually slides on the angular inner portion $h'$ of the partition $h$, over the outer circumference of the cylindrical portion $o'$, and on the wooden lining $t$, from which it drops through the aperture $k$, as is shown in Fig. 1.

The relative distance of the scoops $b$ is such, that always a single potato is engaged between successive scoops, while the other ones are supported on the circumferential portions $b'$ of the scoops or slide downward over the inner edge of the shank $b^2$, so that always a single potato is supplied to each section of the chamber $i$. In order to adapt the apparatus to potatoes of different sizes, the scoops are adjustable by being rocked about the screw bolts $a$. If potatoes of large size are to be planted, the scoops $b$ are rocked with their shanks $b^2$ inward, and in the direction of the arrow $y$ shown in Fig. 1. Thereby the distance of the said shanks from the cylindrical portion $o'$ and the distance of the shanks $b^2$ from the rear edges of the portions $b'$ of the scoops located in front thereof are increased. If potatoes of small size are to be planted the scoops are rocked outward with their shanks $b^2$, whereby the said distances are reduced. Thereby I am enabled to set the scoops in such a way, that always a single potato is supplied to and discharged from each section of the chamber $i$.

While in describing the invention reference has been made to a particular example embodying the same, I wish it to be understood that my invention is not limited to the construction shown in the drawing and that various changes may be made in the general arrangement of the apparatus and the construction of its parts without departing from my invention. While the scoops as shown are made of single pieces of sheet metal, and the relative distances of their front and rear ends are varied according to the size of the potatoes by rocking the same about the screw bolts $a$, it will be understood that such constructions have been shown only by reason of their simplicity, and that in some cases I prefer to combine each scoop of a plurality of pieces and to vary the said relative distance by extending the said parts. Furthermore it will not be advisable in all cases to have the cylindrical portions $o'$ integral with the body $o$, so that the position of the cut-out portion $m$—$n$ relatively to the scoops $b$ can not be varied, though in most cases this construction will be preferable, by reason of its simplicity, as compared to a construction in which the cylindrical portions can be set circumferentially of the body $o$ so as to set the lower edge $n$ of the cut-out portion $m$—$n$ in a higher or lower position.

I claim:

1. In a potato planter, the combination with a rotary dropping drum closed at one side face and having an axial opening in its opposite face and equipped around the opening with carrying members and internally of the opening with picking out members, and a storage member projecting into the dropping drum and through the axial opening thereof and forming with the carrying members sectional chambers in the drum and formed with a discharge opening located in position for delivering the potatoes picked out by the picking out members to the dropping drum, each of said sectional chambers being provided with a discharge opening.

2. In a potato planter, the combination with a rotary dropping drum closed at one side face and having an axial opening in its opposite face and equipped around the opening with substantially radial partitions dividing the annular outer chamber of the drum into sectional chambers and formed on the inner circumference of the drum and rearward of the partitions with guide faces which are sloping from the partitions and toward the circumference of the drum, said drum having discharge openings adjacent to the sloping guide faces, picking out members provided on the drum internally of the axial opening and coöperating each with one of the sectional chambers, and a storage member having a cylindrical portion projecting through the axial opening and into the drum between the partitions and picking out members and providing the inner walls of the sectional chambers and formed in its circumference with a discharge located in position for supplying the potatoes picked out by the picking-out members to the dropping drum.

3. In a potato planter, the combination with a rotary dropping drum closed at one side face and having an axial opening in its opposite face and equipped around the opening with carrying members and internally of the opening with picking out members each in the form of an angle one shank of which is substantially circumferential and the other one is directed inward, and a storage member projecting into the dropping drum and through the axial opening thereof and forming with the carrying members sectional chambers in the drum and formed with a discharge located in position for supplying the potatoes picked out by the picking-out members to the dropping drum.

4. In a potato planter, the combination with a rotary dropping drum closed at one side face and having an axial opening in its opposite face and equipped around the opening with carrying members and internally of the opening with picking out members each in the form of an angle one shank of which is substantially circumferential and the other one is directed inward, means to vary the relative distance of the front and rear ends of successive picking-out members, and a storage member projecting into the dropping drum and through the axial opening thereof and forming with the carrying members sectional chambers in the drum and formed with a discharge located in position for supplying the potatoes picked out by the picking-out members to the dropping drum.

5. In a potato planter, the combination with a rotary dropping drum closed at one side face and having an axial opening in its opposite face and equipped around the opening with carrying members and internally of the opening with picking-out members each in the form of an angle one shank of which is substantially circumferential and the other one is directed inward, means to set said picking-out members in different angular positions, and a storage member projecting into the dropping drum and through the axial opening thereof and forming with the carrying members sectional chambers in the drum and formed with a discharge located in position for supplying the potatoes picked out by the picking-out members to the dropping drum.

6. In a potato planter, the combination of a hopper having a laterally-extending cylindrical member which is provided at one point in its circumference with a discharge-opening, a shaft extending through said member concentrically, a wheel-drum affixed to said shaft and carrying a circumferential series of picking-out members adapted to discharge potatoes one by one through said opening, said drum being provided exterior to said cylindrical member with an annular series of receiving-pockets each of which is provided with a discharge-opening in the peripheral wall of the drum.

7. In a potato planter, the combination of a hopper having a cylindrical member extending laterally therefrom and provided with a discharge-opening in its rear side, and a wheel-drum surrounding said cylindrical member and provided with a circumferential series of picking-out members adapted as the drum rotates forwardly to deliver the potatoes in succession out through said rear discharge-opening, said drum being provided with a circumferential series of pockets adapted to receive the potatoes from said discharge-opening and carry them over the top of said cylindrical member, each of said pockets being provided with a discharge-opening.

In testimony whereof I hereunto affix my signature in the presence of two witnesses.

WILHELM LIPPITZ.

Witnesses:
 RICHARD KAUSCHKE,
 KARL KÜHNAST.